US006859925B2

(12) United States Patent
Lin

(10) Patent No.: US 6,859,925 B2
(45) Date of Patent: Feb. 22, 2005

(54) METHOD FOR SOFTWARE INSTALLATION AND PRE-SETUP

(75) Inventor: Wen-Pin Lin, Taipei Hsien (TW)

(73) Assignees: Wistron Corporation, Hsi-Chih (TW); Acer Incorporated, Hsi-Chih (TW)

( * ) Notice: Subject to any disclaimer, the term of this patent is extended or adjusted under 35 U.S.C. 154(b) by 691 days.

(21) Appl. No.: 09/814,776

(22) Filed: Mar. 23, 2001

(65) Prior Publication Data

US 2002/0049966 A1 Apr. 25, 2002

(30) Foreign Application Priority Data

Oct. 19, 2000 (TW) ........................................ 89122276 A

(51) Int. Cl.$^7$ ............................................. G06F 9/445
(52) U.S. Cl. ............................ 717/178; 711/173; 713/2
(58) Field of Search ............................... 717/168–178; 711/1–6, 129–130, 170–173; 712/13–15; 713/1–2

(56) References Cited

U.S. PATENT DOCUMENTS

| | | | |
|---|---|---|---|
| 5,694,600 A | * 12/1997 | Khenson et al. ................ | 713/2 |
| 5,787,491 A | * 7/1998 | Merkin et al. ................ | 711/173 |
| 6,247,126 B1 | 6/2001 | Beelitz et al. ................. | 713/1 |
| 6,281,894 B1 | * 8/2001 | Rive ........................... | 345/705 |

OTHER PUBLICATIONS

Ng, "Advances in disk technology: performance issues", IEEE, pp. 75–81, May 1998.*
Copy of Taiwanese Office Action English Translation of Taiwanese Offcie Action English Translation of Claim 1 of Taiwanese Patent 408286.

* cited by examiner

*Primary Examiner*—Tuan Dam
*Assistant Examiner*—Ted T. Vo
(74) *Attorney, Agent, or Firm*—Winston Hsu

(57) ABSTRACT

A method for software installation and pre-setup, the installation comprising of downloading image files to a target computer during manufacture, a partition image file being used for partitioning the target computer's storage device into a first, a second and a third partition; boot-up files are stored in the third partition and at least one operating system (OS) image file is stored in the second partition. The method of pre-setup comprises executing the boot-up files when a user powers on the computer for a first time, whereupon an OS selection frame is presented. Upon user OS selection, the computer merges the first and second partitions then explodes the appropriate OS image file into the resulting merged partition. The boot-up files remaining in the third partition are executed during a first reboot, subsequently, the third partition is hidden and the OS in the merged partition executed during a second reboot.

16 Claims, 4 Drawing Sheets

METHOD FOR SOFTWARE INSTALLATION AND PRE-SETUP

REFERENCE TO RELATED APPLICATION

The present application claims priority to Taiwan application No. 089122276, entitled "Method for Software Installation and Pre-Setup," filed on Oct. 19, 2000.

BACKGROUND OF THE INVENTION

1. Field of the Invention

The present invention relates to a method for software installation and pre-setup, and more particularly to a method for software installation and pre-setup to reduce the cost of manufacture and promote the flexibility of software installation and pre-setup.

2. Description of the Prior Art

In the prior art, before shipping out a computer, a computer manufacturer installs an operating system (OS) in a storage device of the computer. The OS comprises OS drivers and OS application programs. In the process of manufacturing, the manufacturer installs an OS image file onto the hard disk of the computer. When a user powers on the computer, the computer explodes or decompress the OS image file onto the hard disk to pre-setup the OS.

In the process of manufacturing, the manufacturer also installs patch files onto the hard disk of the computer. The patch files are used for updating and correcting the OS drivers or OS application programs of the OS. Usually, the patch files are under a patch directory. After the user pre-sets up the OS, the computer copies the patch files to the locations of original files and1 replace the original files.

As usual, the shipped-out computer is bundled with a recovery CD (compact disk) and a system CD. The recovery CD comprises boot-up files and OS image files. When the computer fails to function properly due to errors such as some required files of the OS are destroyed, the user can use the recovery CD to recover the OS according to the OS image files in the recovery CD. The system CD comprises patch files. When the OS drivers or OS application programs are updated, the manufacturer stores the patch files (updated files) in the system CD. Therefore, the user can use the system CD to update OS drivers or OS application programs.

If the computer is shipped out to a multilingual country, such as Switzerland where people speak three official languages (German, French and Italian), the manufacturer has to install three OS image files onto the hard disk. In other words, German, French and Italian versions of OS image files are all required.

In addition, in order to install multiple OS image files onto the hard disk, manufacturers have to use Microsoft Multiple Operating system Preinstallation Toolkit (MPK) to format the hard disk by Microsoft-specified format standards. However, if the OS drivers or the OS application programs are updated, the updated files cannot directly replace the original file for MPK format cannot be amended. That makes file updating for both OS drivers or OS application programs an inconvenient task.

The computer has three versions of OS. When a user powers on the computer, the computer generates a selection frame for the user to select a version in need.

Besides, if the computer is shipped out to a multilingual country, taking Switzerland for example, the manufacturer has to bundle three recovery CDs to the computer. The three recovery CDs are used for storing a German OS image file, a French OS image file and an Italian OS image file respectively.

However, among three recovery CDs, only one of them can comprise boot-up files according to Microsoft's rules regarding bundle software. As a result, when the computer fails to function properly, the user has to insert the recovery CD with the boot-up files to boot the computer at first, and then change to the recovery CD having desired language version of the OS image file for recover the OS of the computer.

Furthermore, in the Switzerland example, apart from the three recovery CDs, a system CD also has to be bundled along with the computer being shipped. In total, four CDs including three-language versions recovery CD and one system CD greatly increases the burden of manufacturing cost.

SUMMARY OF THE INVENTION

It is therefore a primary objective of the present invention to provide a method for software installation and pre-setup to solve the above-mentioned problems.

In a preferred embodiment, the present invention provides a method for software installation and pre-setup. The method of software installation comprises the following steps. First, a computer downloads a partition image file to a storage device of the computer from a server via a network. The partition image file is used for partitioning the storage device into a first partition, a second partition, and a third partition. The computer stores boot-up files in the third partition for setting the third partition as an active partition. Each of the computers downloads at least one operating system (OS) image file to the second partition of the storage device of the computer from the server via the network.

The method of software pre-setup comprises the following steps. When a user powers on the computer at the start, the computer executes the boot-up files in the third partition for booting the computer. Then, the computer polls the filenames of the OS image files to generate a selection frame. The selection frame comprises several options, and each of the options corresponds to a specific OS. After the user selects one OS, the computer merges the first and second partitions to form a merged partition.

Whereas the second partition still exits in the computer, the computer is able to access the second partition. The computer explodes the OS image file corresponding to the OS chosen by the user from the second partition to the merged partition. Then, the computer executes the boot-up files in the third partition for a first reboot of the computer. Subsequently, the computer hides the third partition, and then executes the OS in the merged partition for a second reboot of the computer.

It is an advantage of the present invention that a hard disk is partitioned into three partitions so as to store a plurality of OS image files onto the hard disk. In this way, the OS drivers and the OS application programs can be updated directly. Besides, it is more flexible for the manufacturer to install software so as to provide the user more options. The computer manufacturer can install the OS and application programs in the computer according to the user's demand.

These and other objectives of the present invention will no doubt become obvious to those of ordinary skill in the art after having read the following detailed description of the preferred embodiment, which is illustrated in the various figures and drawings.

BRIEF DESCRIPTION OF THE DRAWINGS

The following detailed description, given by way of examples and not intended to limit the invention to the embodiments described herein, will best be understood in conjunction with the accompanying drawings, in which.

DETAILED DESCRIPTION OF THE PREFERRED EMBODIMENT

Figure 1:
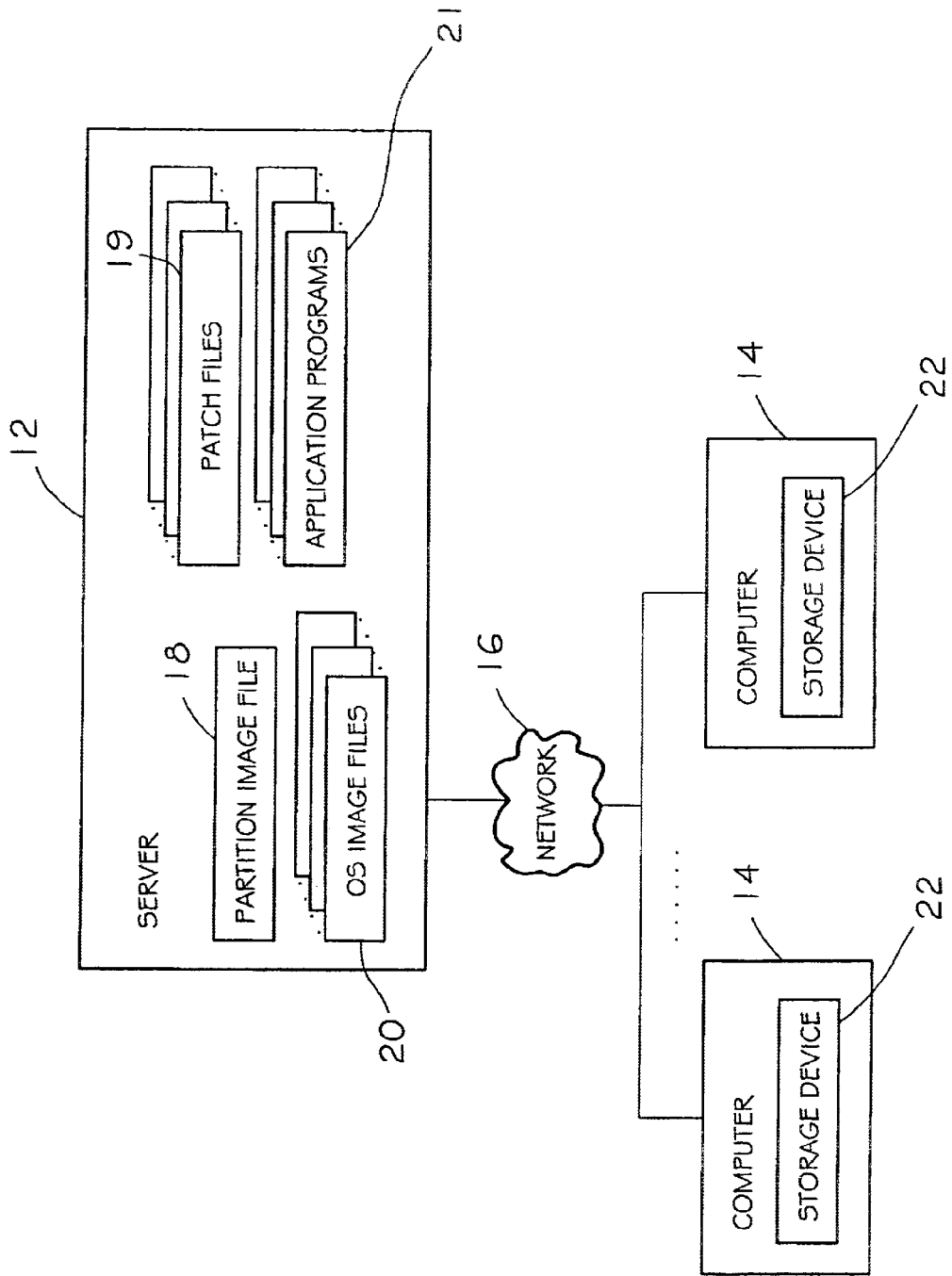
FIG. 1 is a perspective diagram of a system for software installation according to the present invention.

Please refer to FIG. 1. FIG. 1 is a perspective diagram of a system 10 for software installation according to the present invention. The system 10 comprises a server 12, and a plurality of computers 14. The computers 14 are connected to the server 12 via a network 16. The server 12 comprises a partition image file 18, a plurality of OS image files 20, a plurality of patch files 19, and a plurality of application programs 21. Each of the computers 14 comprises a storage device 22. The storage device 22 is a hard disk.

Figure 2B:
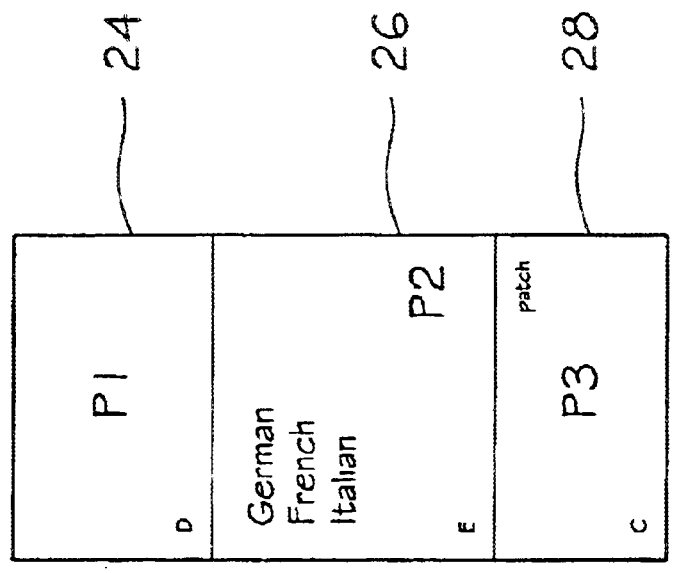
FIG. 2(b) is a perspective diagram of the partitioned storage device of the computer in the process of the software installation.
Figure 2A:
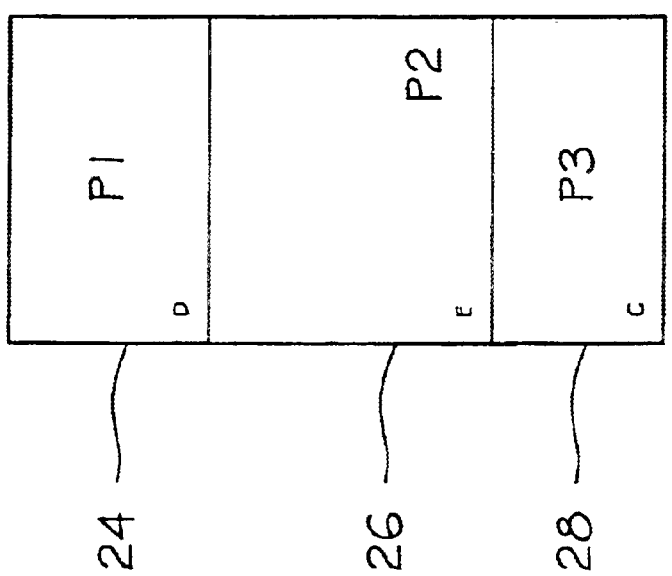
FIG. 2(a) is a perspective diagram of the partitioned storage device of the computer in the process of the software installation.
Figure 4:
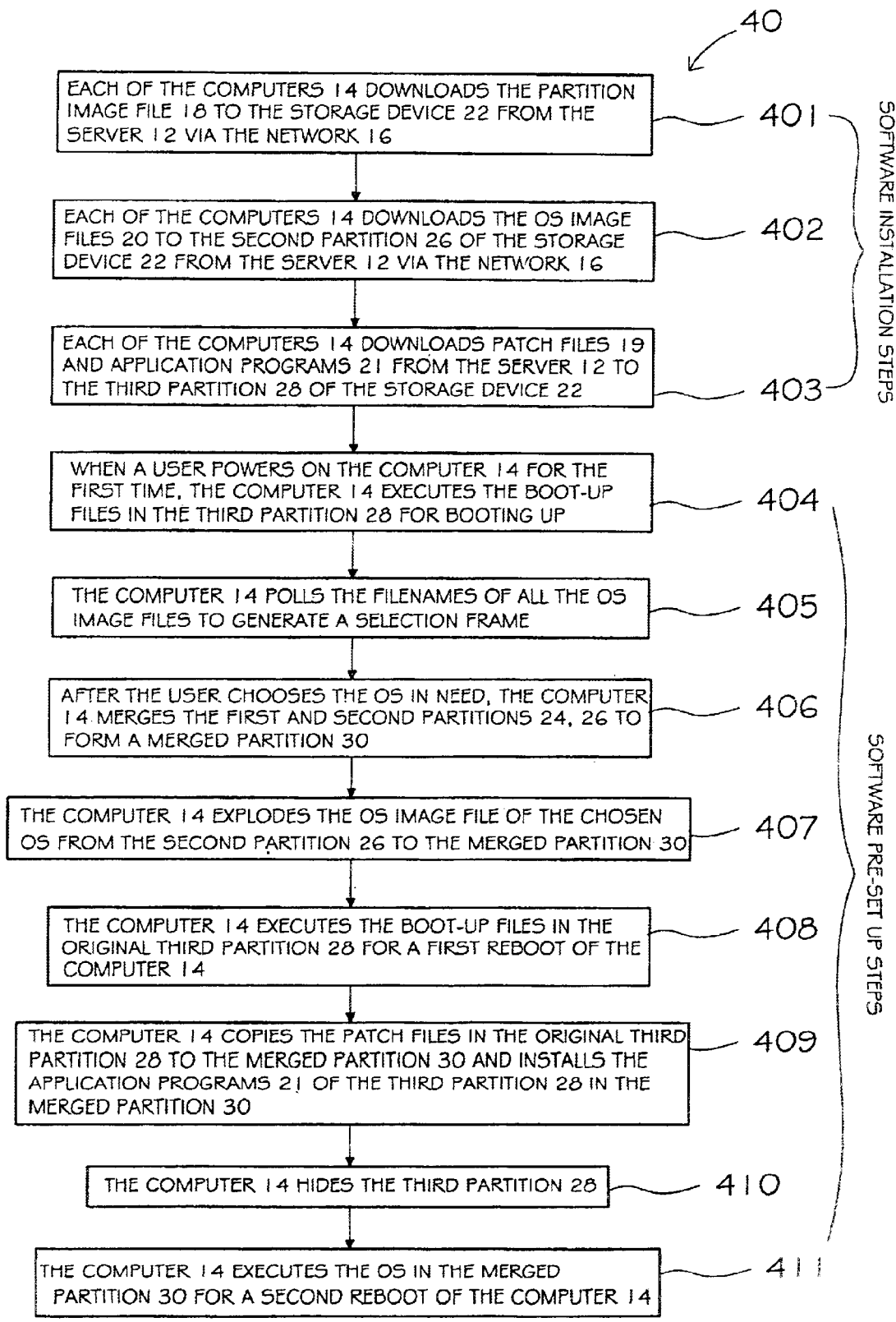
FIG. 4 is a flow chart of the method for software installation and pre-set up according to the present invention.

Please refer to FIG. 2 and FIG. 4. FIG. 2 is a perspective diagram of the partitioned storage device 22 of the computer 14 in the process of the software installation. FIG. 4 is a flow chart of the method 40 for software installation and pre-set up according to the present invention. In the manufacturing process, the partition image file 18 is downloaded to the storage device 22 of each of the computers 14 from the server 12 via the network 16 (the step 401 in FIG. 4). After the partition image file 18 is exploded, the storage device 22 is partitioned into a first partition 24, a second partition 26, and a third partition 28, and the boot-up files are stored in the third partition 28 for setting the third partition 28 as an active partition. As shown in FIG. 2, the third partition 28 is C drive, the first partition 24 is D drive, and the second partition 26 is E drive.

The capacity of the first partition 24 (D drive) accounts for half the total capacity of the storage device (hard disk) 22, the capacity of the third partition 28 (C drive) is 50 megabytes, and the capacity of the second partition 26 (E drive) accounts for the remaining portion after the capacity of the first partition 24 and the third partition 28 are deducted from the total capacity of the storage device 22.

Then, the OS image files 20 are downloaded to the second partition 26 of the storage device 22 of the computer 14 from the server 12 via the network 16 (the step 402 in FIG. 4). As shown in FIG. 2(b), the second partition 26 comprises three OS image files. They are German, French, Italian OS image files.

Each of the computers 14 downloads patch files 19 and application programs 21 from the server 12 to the third partition 28 of the storage device 22 (the step 403 in FIG. 4). The application program 21 can be the Microsoft Word, Microsoft Excel, and so on.

Please refer to FIG. 3. FIG. 3 is a perspective diagram of the partitioned storage device 22 of the computer 14 in the process of the software pre-set up. As the step 404 in FIG. 4, when a user powers on the computer 14 for the first time, the computer 14 executes the boot-up files in the third partition 28 for booting up. Then, as the step 405 in FIG. 4, the computer 14 polls the filenames of all the OS image files to generate a selection frame. This selection frame comprises a plurality of options, and each of the options corresponds to a specific OS. In this case, since the second partition 26 comprises three OS image files, the selection frame has three options that are the German OS, the French OS, and the Italian OS respectively for the user to select.

Figure 3B:
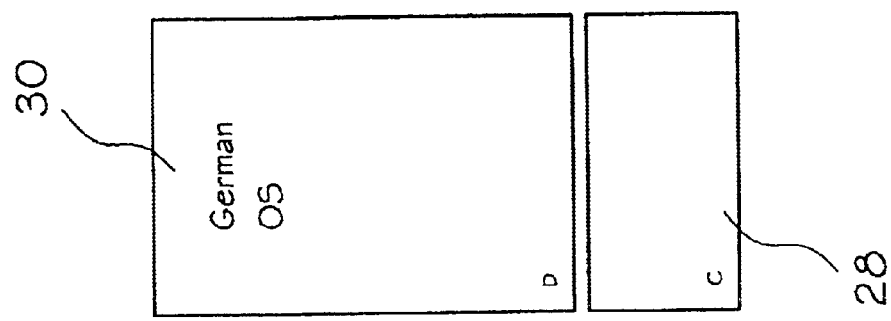
FIG. 3(b) is a perspective diagram of the partitioned storage device of the computer in the process of the software pre-set up.
Figure 3A:
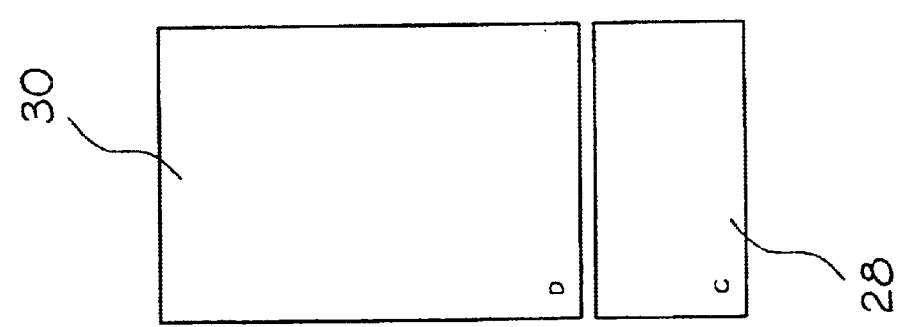
FIG. 3(a) is a perspective diagram of the partitioned storage device of the computer in the process of the software pre-set up.

After the user chooses the OS in need, for example, the user has chosen the German OS, the computer 14 merges the first and second partitions 24, 26 to form a merged partition 30 as the step 406 in FIG. 4. As shown in FIG. 3(a), the third partition 28 is C drive, and the merged partition 30 is D drive. Before the computer 14 reboots, the second partition 26 still exits in the computer 14, and the computer 14 still can access the second partition 26.

Next, the computer 14 explodes the OS image file of the chosen OS (the German OS image file in this case) from the second partition 26 to the merged partition 30 by the GHOST software (the step 407 in FIG. 4). As shown in FIG. 3(b), the chosen OS (the German OS) has been in the third partition 30. As the step 408 in FIG. 4, the computer 14 executes the boot-up files in the original third partition 28 for a first reboot of the computer 14.

After the first reboot of the computer 14, the computer 14 copies the patch files in the original third partition 28 to the merged partition 30 to update the OS drivers or OS application programs of the OS in the merged partition 30. The computer 14 also installs the application programs 21 of the third partition 28 in the merged partition 30 (the step 409 in FIG. 4). After copying the patch files and installing the application programs, the computer 14 hides the third partition 28 (the step 410 in FIG. 4). As the step 411 in FIG. 4, the computer 14 executes the OS in the merged partition 30 for a second reboot of the computer 14. The process from the user first powering on the computer 14 to the second reboot of the computer 14 is the process of software pre-setup.

The first partition 24, the second partition 26, the third partition 28, and the merged partition 30 are primary partitions.

In the process of manufacturing, the computer manufacturer not only can install different operating systems according to the user's demand, but also can install different application programs 21 in the third partition according to the user's demand. The capacity of the third partition is flexible on condition that it is sufficient to store the application programs. Before shipping out the computers, the manufacturer inquires user's demand. In addition to install different language versions of the OS image files, the manufacturer can install different versions of OS, such as Microsoft Windows 98, Microsoft Windows 2000, Windows Me to meet the user's need. When the user powers on the computer for the first time, the user can select the OS as required.

Furthermore, the manufacturer can inquire user's demand for application programs and install the application programs in the third partition according to the user's demand. In the process of software pre-setup, when the computer reboots for the first time, the computer automatically installs the application programs 21 of the third partition in the merged partition 30. Therefore, the user does not have to repeat the installation of application programs.

The invention allows the computer manufacturer to bundle one recovery CD and one system CD to the computer when the computer is shipped to a multilingual country. The recovery CD comprises a partition image file and a plurality of OS image files. For example, if the computer is shipped to Switzerland, the recovery CD includes German, French, and Italian OS image files. When the computer fails to function properly due to errors, a user can use the recovery CD to recover the computer. If the user wants to re-install an OS, the user also can use the recovery CD to re-select the OS. For example, a user may originally use Chinese version of MicroSoft Windows 98 which adapts traditional character. If the user wants to replace the OS with Chinese version of MicroSoft Windows 98 which adapts simplified character, the user can use the recovery CD to re-install the OS.

The system CD comprises patch files and application programs. When the OS drivers or the OS application programs of the OS are updated, the manufacturer stores the patch files in the system CD. Therefore, the user can use the system CD to update the OS drivers or the OS application programs. Furthermore, the manufacturer can store the application programs required by the user in the system CD. After the user uses the recovery CD to re-install a new OS, the user can use the system CD to update the OS drivers or the OS application programs, and to re-install the application programs in need in the computer.

Compared to the prior art, by using the method for software installation and pre-setup according to the present invention, the computer manufacturer partitions the hard disk into three partitions so as to store a plurality of OS image files onto the hard disk. Besides, the OS drivers and the OS application programs can be updated directly. Even when the computer is shipped to a multilingual country, the computer manufacturer only has to bundle one recovery CD and one system CD to the computer. Therefore, the cost of manufacturing is greatly reduced.

Furthermore, by using the method for software installation and pre-setup according to the present invention, it is more flexible for a manufacturer to install software so as to provide users more options. The computer manufacturer can install the OS and application programs in the computer according to the user's demand. The user can select the OS in need, and reselect a new OS by using the recovery CD. In the process of software pre-setup, the computer automatically installs the application programs. The computer manufacturer only has to bundle one recovery CD and one system CD to the shipped-out computer. Therefore, the user is provided various selections without increasing the cost of manufacturing.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of software installation and pre-setup, comprising:
   a method of software installation which comprises steps as follows:
      downloading a partition image file to a storage device of at least one computer from a server via a network used for partitioning the storage device into a first partition, a second partition, and a third partition, and storing at least one boot-up file in said third partition for setting said third partition as an active partition; and
      downloading at least one operating system (OS) image file to said second partition of the storage device of the computer from the server via the network;
   a method of software pre-setup which comprises steps as follows:
      when a user powering on the computer for a first time, the computer executing the boot-up file in said third partition for booting;
      the computer polling the filename of said OS image file to generate a selection frame, said selection frame comprising at least one option wherein each said option corresponds to a specific OS;
      after the user selecting one OS, the computer merging said first and second partitions to form a merged partition, said second partition still exiting in the computer and the computer being able to access said partition;
      the computer exploding the OS image file corresponding to the OS chosen by the user from said second partition to said merged partition;
      the computer executing the boot-up file in said third partition for a first reboot of the computer;
      the computer hiding said third partition; and
      the computer executing the OS in said merged partition for a second reboot of the computer.

2. The method of claim 1 wherein the storage device is a hard disk.

3. The method of claim 1 wherein said first, second, third and merged partitions are primary partitions.

4. The method of claim 1 wherein the capacity of said first partition accounts for half the total capacity of the storage device, the capacity of said third partition is 50 megabytes, and the capacity of said second partition accounts for the remaining portion after the capacity of said first partition and said third partition are deducted from the total capacity of the storage device.

5. The method of claim 1 wherein when the server comprises at least one patch file, the computer downloads the patch file(s) from the server to said third partition of the storage device after downloading the OS image file(s), and when the computer reboots for the first time, the computer copies the patch file(s) in said third partition to said merged partition for correcting the OS.

6. The method of claim 1 wherein when the server comprises at least one application program, the computer downloads the application program(s) from the server to said third partition of the storage device after downloading the OS image file(s), and when the computer reboots for the first time, the computer installs the application program(s) of said third partition in said merged partition.

7. A system for initial software installation, comprising:
   a server connected to a network, the server comprising a partition image file, at least one boot-up file and at least one operating system (OS) file;
   the partition image file comprising:
      code for partitioning a storage device of a computer into a first partition, a second partition, and a third partition;
   the boot-up file comprising:
      code enabling a computer to:
         poll the filename of an OS image file to generate a selection frame display, said selection frame display comprising at least one option wherein each option corresponds to a specific OS file;
         process a user OS selection;
         merge the first and second partitions to form a merged partition, said second partition still existing in the computer and the computer being able to access said partition;
         explode the OS image file corresponding to the OS selected by the user from the second partition to the merged partition;

initiate a first reboot operation;
hide the third partition; and
execute the OS in said merged partition upon a second reboot of the computer;
and
at least one computer connected to the network comprising a storage device;
wherein the computer downloads the partition image file, the boot-up file(s) and the OS file(s) from the server to the storage device via the network.

8. The system of claim 7 wherein the server comprises at least one patch file, the computer downloads the patch file(s) from the server to the storage device after downloading the OS image file(s).

9. The system of claim 7 wherein when the server comprises at least one application program, the computer downloads the application program(s) from the server to the storage device after downloading the OS image file(s).

10. The system of claim 7 wherein the first partition accounts for half the total capacity of the storage device, the third partition accounts for 50 megabytes of the storage device and the second partition accounts for the remaining portion after the capacity of the first and third partitions are deducted frow the total capacity of the storage device.

11. A computer comprising:
a storage device comprising a first partition, a second partition and a third partition;
at least one operating system (OS) image file stored in said second partition of the storage device; and
at least one boot-up file stored in said third partition of the storage device; the boot-up file comprising:
code enabling the compute to:
poll the filename of an OS image file to generate a selection frame display, said selection frame display comprising at least one option wherein each option corresponds to a specific OS file;
process a user OS selection;
merge the first and second partitions to form a merged partition, said second partition still existing in the computer and the computer being able to access said partition;
explode the OS image file corresponding to the OS selected by the user from the second partition to the merged partition;
initiate a first reboot operation;
hide the third partition; and
execute the OS in said merged partition upon a second reboot of the computer;
wherein the user selected OS permanently supercedes the polling function upon installation.

12. The system of claim 11 wherein the computer further comprises at least one patch file stored in said third partition of the storage device.

13. The system of claim 11 wherein the computer further comprises at least one application program stored in said third partition of the storage device.

14. A computer-readable medium used in a computer, the medium comprising:
a partition image file;
at least one operating system (OS) file; and
at least one boot-up file; the boot-up file comprising:
code enabling a computer to:
poll the filename of an OS image file to generate a selection frame, said selection frame comprising at least one option wherein each said option corresponds to a specific OS file;
process a user OS selection;
merge two partitions of a computer-readable medium to form a merged partition, at least one of the two original partitions still exiting in the computer and the computer being able to access said partition;
explode the OS image file corresponding to the OS selected by the user from one of the original partitions to the merged partition;
initiate a first reboot operation;
hide a third partition; and
execute the OS in said merged partition upon a second reboot of the computer;
wherein;
said partition image file is used for partitioning a computer-readable medium of a computer into a first partition, a second partition, and a third partition;
the boot-up file(s) are stored in said third partition for setting said third partition as an active partition; and
the OS image file(s) are stored in said second partition of the storage device.

15. The medium of claim 14 further comprising at least one patch file, wherein the patch files are used for correcting an OS of the computer.

16. The medium of claim 15 further comprising at least one application program to be installed in the computer.

* * * * *